United States Patent [19]

Posselt et al.

[11] 3,859,305

[45] Jan. 7, 1975

[54] INDOLE AMINOKETONES

[75] Inventors: Klaus Posselt, Bergen-Enkheim, Germany; Kurt Thiele, Barcelona, Spain

[73] Assignee: Deutsche Gold-und Silber-Scheideanstalt vormals Roessler, Frankfurt am Main, Germany

[22] Filed: Apr. 26, 1971

[21] Appl. No.: 137,575

Related U.S. Application Data

[60] Continuation-in-part of Ser. No. 18,300, March 10, 1970, Pat. No. 3,658,845, Division of Ser. No. 693,138, Dec. 26, 1967, Pat. No. 3,514,465.

[52] U.S. Cl..... 260/326.15, 260/288 A, 260/295 R, 260/296 R, 260/302 R, 260/306.7, 260/310 R, 260/326.15, 260/326.3, 424/274
[51] Int. Cl. ............................................. C07d 27/56
[58] Field of Search............... 260/326.14 R, 326.15

[56] References Cited
UNITED STATES PATENTS
3,371,098  2/1968  Kralt et al................. 260/326.14 R

*Primary Examiner*—Joseph A. Narcavage
*Attorney, Agent, or Firm*—Cushman, Darby & Cushman

[57] ABSTRACT

Compounds of the formula

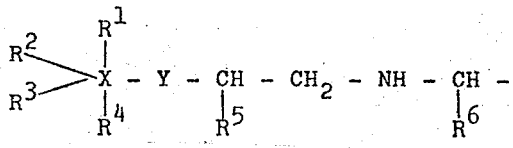

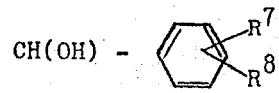

I their salts and quaternary ammonium compounds, as well as their optically active isomers or diastereomers wherein $R^1$ to $R^4$ represent hydrogen, halogen, lower alkyl, aralkyl, phenyl, hydroxyl, lower alkoxy, nitro or lower carboalkoxy, $R^5$ and $R^6$ are hydrogen or methyl, $R^7$ and $R^8$ are hydrogen, halogen or lower alkoxy, X is a heterocyclic ring system, mono- or condensed bicyclic, with 1 – 4 hetero atoms, in which the individual rings have 5 to 6 members and can also contain 1 or more carbonyl groups, Y is —CO— or —CH(OH)—. These compounds have pharmacological activity in that they increase the coronary blood flow by simultaneously causing dilation of the coronaries and an increase in contraction strength.

14 Claims, No Drawings

INDOLE AMINOKETONES

This application is a continuation-in-part of application Ser. No. 18,300 filed Mar. 10, 1970 now patent 3,658,845 which in turn is a division of application Ser. No. 693,138 filed Dec. 26, 1967 now patent 3,514,465.

The following heterocyclic ring systems, for example, come into consideration for the compounds according to the invention: furane, thiophene, pyrrole, pyrazole, thiazole, pyridine, pyrimidine, triazine, pyrazolone, benzofurane, benzothiophene, indole, quinoline, isoquinoline, benzodioxol, benzodioxane, decahydroisoquinoline, benzothiazole and benzimidazole.

In a more specific aspect of the invention the preferred compounds of the invention have the formula

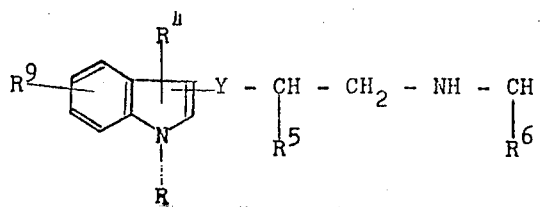

where $R^3$ is H or alkyl, $R^4$ and $R^9$ are hydrogen, halogen, lower alkyl, phenyl, hydroxyl, lower alkoxy, nitro and lower carboalkoxy, $R^5$ and $R^6$ are hydrogen or methyl, $R^7$ and $R^8$ are hydrogen, halogen or lower alkoxy.

The compounds according to the invention of the above formula I can be produced in a known manner by a. reacting a compound of the formula

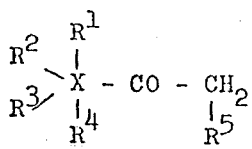

with a compound of the formula

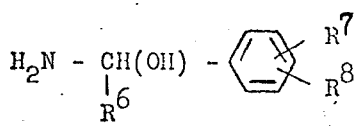

in the presence of formaldehyde or a formaldehyde source and a solvent.

b. Reacting a compound of the formula

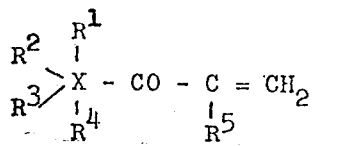

or the corresponding Mannich base of the formula

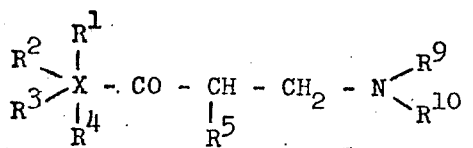

wherein $R^9$ and $R^{10}$ are lower alkyl with a compound of formula III or c. reacting a compound of the formula

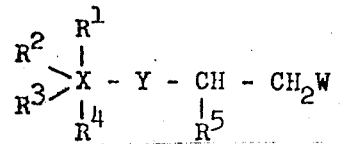

with a compound of the formula

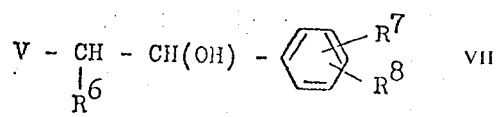

in which W and V are different and are either halogen or $NH_2$ in the presence of a basic substance and, if desired, in the event Y is CO, reducing such group to a CH(OH) group and, if desired, converting the bases produced into their pharmacologically acceptable acid addition salts or quaternary ammonium salts.

The process according to method a) is carried out in the usual manner at a temperature between 20° and 150°C. Alcohols, dioxane, glacial acetic acid and the like come into consideration as solvents.

The process according to method b) in general when using an unsaturated ketone of formula IV can be carried out at temperatures between 20° and 80°C in an inert solvent, such as, ether, acetone, dioxane or chloroform, whereas when the corresponding Mannich base is used, which during the reaction is transformed into an intermediate of formula IV, the reaction temperature used is normally higher, preferably, between 80° and 120°C, and solvents such as water, alcohol/water, or a two phase system such as benzene/water toluene/water come into consideration.

The process according to method c) is usually carried out at elevated temperatures in a solvent such as alcohols, ether, dimethyl formamide and the like.

The compounds produced which contain optically active carbon atoms and which as a rule are produced as racemates can be resolved into their optically active isomers in the usual manner, for example, with the aid of an optically active acid. It, however, is also possible to employ optically active compounds or diastereomers as the starting materials whereby the end product in the corresponding pure optically active form or diastereomeric configuration is obtained.

The free bases can be converted into their salts with the usual pharmacologically acceptable acids such as HCl, HBr, $H_2SO_4$, acetic acid, citric acid, succinic acid, maleic acid, fumaric acid, lactic acid, p-toluene sulfonic acid and the like. Those compounds containing basic tertiary nitrogen atoms can be converted to their quaternary salts with the usual pharmacologically acceptable quaternizing agents such as the lower alkyl halides. The free bases can be removed from the salts, for example, by treatment with aqueous NaOH and other salts can be prepared from such free bases.

As already indicated, the compounds according to the invention have a pharmacological activity in that they increase the coronary blood flow by causing dilation of the coronaries, as well as an increase in contraction strength of the heart.

When tested on the isolated guinea pig heart according to Langendorff (Pfluger's Arch. 61, 291, 1895) it was found that the compounds according to the invention were active in doses between 10 – 500 μg/heart (μg = ε = microgram) in dilating the coronaries while simultaneously increasing the contraction strength.

The indications for the compounds according to the invention are:
Coronary insufficiency
Angina pectoris
Myocardial infarct
Myocardial insufficiency
Circulatory disturbances of various geneses
Disturbances of the peripheral and cerebral blood flow
Migraines
Arteriosclerosis The novel compounds can be used, if desired, also in combination with other medicaments in the form of pharmaceutical compositions suited for enteral, parenteral, oral or per lingual application.

The acute toxicity of the compounds according to the invention when tested on mice by the method of Miller and Tainter (Proc. Soc. exper. Biol. a Med 57, 261, 1944) expressed as the LD 50 is between 100 mg/kg and 5000 mg/kg oral.

The individual doses for human beings, depending on form of administration are between 0,5 and 100 mg, once or more times a day.

The following examples will serve to illustrate the compounds according to the invention. For sake of simplicity the symbol Z is used in the structural formulae and nomenclature of a number of the examples to represent, respectively

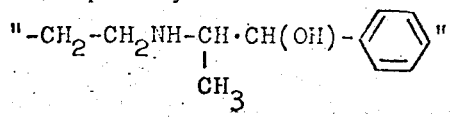

and
2-[3-phenyl-3-hydroxy-propyl-(2)-amino]-ethyl

EXAMPLE 1

1- 2-[3-phenyl-3-hydroxy-propyl-(2)-amino]-ethyl - thienyl-(2)-ketone, that is, 1- Z -thienyl-(2)-ketone

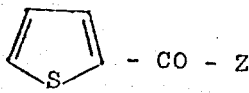

Method a.

12.6 g (0.1 mol) of 2 acetyl- thiophene, 18.7 g (0.1 mol) of 1-norephedrine O HCl and 4 g (0.13 mol) of paraformaldehyde were dissolved in 20 ml of isopropanol and after addition of 0.2 mol of concentrated HCl boiled under reflux for 2 hours. Thereafter 100 ml of acetone were added to the still warm solution. The hydrochloride which crystallized out upon cooling was purified by recrystallization from ethanol. Its melting point was 191° – 192° C and the yield 17 g.

Method b.

1.5 g (0.01 mol of 1-norephedrine were dissolved in 50 ml of ether and 2.7 g (0.02 mol) of thienyl vinyl ketone dissolved in 10 ml of ether added thereto. After ½ hour 2 g of the base separated out which after recrystallization from ethanol had a melting point of 118° – 120° C. The hydrochloride produced therefrom had a melting point of 191° – 192° C.

Method c.

5.2 g (0.03 mol) of 2-[β-chloropropionyl]-thiophene were dissolved in dimethyl formamide and united with a solution of 4.5 g (0.03 mol) of 1-norephedrine and 4 g (0.03 mol) of triethylamine in 25 ml of dimethyl formamide. After 1 hour the triethylamine HCl which was formed was filtered off and the filtrate acidified with isopropanolic HCl. Subsequently, the HCl salt was precipitated from the solution by addition of ether and recrystallized from ethanol. Its melting point was 191° – 192° C and the yield was 7 g.

EXAMPLE 2

1- Z -phenyl-(2)-ketone

11 g (0.1 mol) of 2-acetyl-furan, 18.7 g (0.1 mol) of 1-norephedrine . HCl and 4 g (0.13 mol) of paraformaldehyde were heated for 2 hours under reflux in 20 ml of isopropanol with the addition of 5 drops of ethanolic HCl. The HCl salt which had precipitated out was stirred up with 50 ml of acetone and filtered off. It was purified by recrystallization from ethanol. Its melting point was 186° – 187° C and the yield was 10.5 g.

EXAMPLE 3

1- Z -[4-methyl-thiazolyl-(2)]-ketone

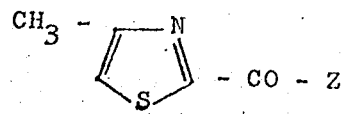

7 g (0.05 mol) of 4-methyl-2-acetyl-thiazole, 9.4 g (0.05 mol) of 1-norephedrine . HCl, 2 g (0.067 mol) of paraformaldehyde and 5 drops of isopropanolic HCl in 20 ml of isopropanol were reacted and processed as in Example 2. The HCl salt was recrystallized from methanol. Its melting point was 197° – 199° C and the yield 7 g.

EXAMPLE 4

1- Z -antipyryl-(4)-ketone

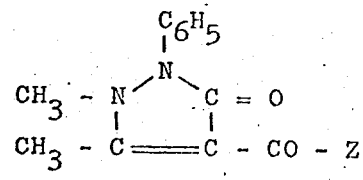

11.5 g of 4-acetyl-antipyrin (0.05 mol), 9.5 g of 1-norephedrine . HCl (0.05 mol) and 2 g of paraformaldehyde (0.067 mol) were introduced into 20 ml of isopropanol and 5 drops of isopropanolic HCl added thereto and the mixture boiled for a total of 5 hours during which after 3 hours an additional 1 g of paraformaldehyde was added. Thereafter the solvent was distilled off and the residue treated with aqueous soda. The oily Mannich base produced was crystallized with the aid of ether. It formed the dihydrochloride with 2 mol of HCl which was recrystallized from ethanol. Its melting point was 206° – 208° C and the yield was 9 g.

EXAMPLE 5

1- Z -pyridyl-(3)-ketone

40 g (0.33 mol) of 3-acetyl-pyridine, 18.7 g (0.1 mol) of l-norephedrine . HCl and 3 g (0.1 mol) of paraformaldehyde were boiled under reflux in 15 ml of isopropanol for a total of 3 hours. An additional 1 g of paraformaldehyde was added after 1 hour. Thereafter the reaction mixture was diluted with acetone and the precipitated HCl salt was recrystallized from methanol/ethanol (1:2). Its melting point was 187° – 189° C and the yield 7 g.

EXAMPLE 6

1- Z -[2,4-dimethyl-thiazolyl-(5)]-ketone

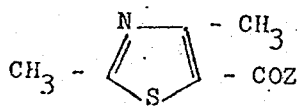

25 g (0.16 mol) of 2,4-dimethyl-5-acetyl-thiazole, 30 g (0.16 mol) of l-norephedrine . HCl and 5 g (0.16 mol) of paraformaldehyde were introduced into 50 ml of isopropanol and 15 drops of isopropanolic HCl added thereto. The mixture was boiled on a water bath for a total of 1 hour. An additional 1.5 g of paraformaldehyde was added after ½ hour. The reaction solution was diluted with 100 ml of acetone while still warm. The HCl salt which precipitated out was recrystallized from 80% ethanol. Its melting point was 208° – 210° C and the yield 6.6 g.

EXAMPLE 7

1- Z -[4-methyl-2-hydroxy-thiazolyl-(5)]-ketone

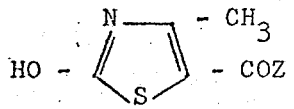

5 g (0.035 mol) of 4-methyl-2-hydroxy-5-acetylthiazole, 6.6 g (0.035 mol) of l-norephedrine . HCl and 1.5 g (0.05 mol) of paraformaldehyde were boiled under reflux for 2 hours in 20 ml of glacial acetic acid. The HCl salt which crystallized out on cooling was recrystallized from methanol/ethanol (1:1). Its melting point was 209° – 210° C and the yield 4.5 g.

EXAMPLE 8

1- Z -cumaronyl-ketone

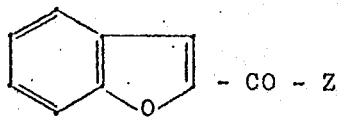

40 g (0.25 mol) of 2-acetyl cumarone, 46.5 g (0.25 mol) of l-norephedrine . HCl and 7.5 g (0.25 mol) of paraformaldehyde were dissolved in 200 ml of isoamyl alcohol and after addition of 10 drops of ethanolic . HCl boiled under reflux for ½ hour. Then an additional 2.5 g (0.083 mol) of paraformaldehyde were added and the mixture refluxed for a further ¼ hour. The solution was diluted with 100 ml of acetone while still warm. Upon cooling the HCl salt crystallized out. It was recrystallized from ethanol. Its melting point was 199° – 200° C and the yield 31.5 g.

EXAMPLE 9

1-3- 3-[3-phenyl-3-hydroxy-propyl-(2)-anlino]-propionyl -thionaphthene

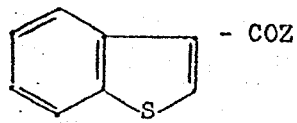

17.6 g (0.1 mol) of 3-acetyl-thionaphthene, 18.7 g (0.1 mol) of l-norephedrine . HCl and 4.5 g (0.15 mol) of paraformaldehyde were boiled under reflux for 2 hours in 50 ml of isopropanol. The solution was then diluted with 100 ml of acetone while still warm. Upon cooling the HCl salt precipitated out. It was recrystallized from methanol. Its melting point was 220° – 221° C and the yield 18.5 g.

EXAMPLE 10

1-3- 3-phenyl-3-hydroxy-propyl-(2)-amino]-propionyl -1-methyl-indole

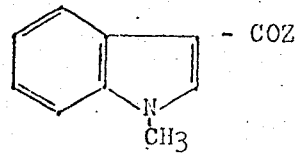

25 g (0.13 mol) of 1-methyl-3-acetyl-indole, 24.3 g (0.13 mol) of l-norephedrine . HCl and 5 g (0.17 mol) of paraformaldehyde were dissolved in 100 ml of isopropanol and boiled under reflux for a total of 6 hours. After the second and fourth hours an additional 2.5 g of paraformaldehyde were added. Thereafter the solvent was distilled off and the residue dissolved in warm acetone. The HCl salt which crystallized out on cooling was recrystallized from ethanol. Its melting point was 194° – 195° C and the yield 22 g.

EXAMPLE 11

1-5-[3-[3-phenyl-3-hydroxy-propyl-(2)-amino]-propionyl]-benzodioxol-(1,3)

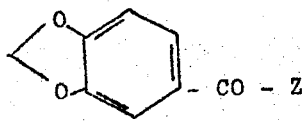

8 g (0.048 mol) of 5-acetyl-benzodioxol-(1,3), 91.1 g (0.048 mol) of l-norephedrine HCl and 2.9 g (0.097 mol) of paraformaldehyde were boiled on a water bath for 2 hours in 30 ml of isopropanol after addition of 5 drops of isopropanolic HCl. After addition of 100 ml of acetone to the warm reaction solution, the HCl salt precipitated out. It was recrystallized from ethanol. Its melting point was 195° – 197° C and the yield 9 g.

EXAMPLE 12

1-4- 3-[3-phenyl-3-hydroxy-propyl-(2)-amino]-propionyl -1,3-dimethyl and -1,5-dimethyl pyrazole (mixture)

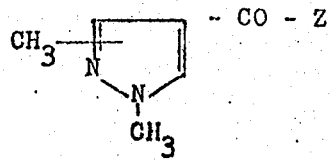

26 g (0.19 mol) of the isomeric mixture of 1,3-and 1,5-dimethyl-4-acetyl-pyrazole formed during the synthesis, 37.4 g (0.2 mol) of 1-norephedrine . HCl and 9 g (0.3 mol) of paraformaldehyde were boiled under reflux under an atmosphere of nitrogen in 150 ml of isopropanol for 3 hours. Upon cooling the HCl salt crystallized. It was recrystallized from isopropanol and then twice from ethanol. Its melting point was 196° C and the yield 11 g.

EXAMPLE 13

1- Z -quinolyl-(3)-ketone

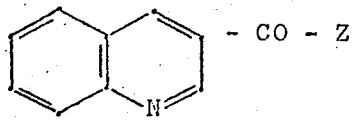

10 g (0.058 mol) of 3-acetyl quinoline, 11.2 g (0.058 mol) of 1-norephedrine . HCl and 1.6 g (0.058 mol) of paraformaldehyde were boiled under reflux on a water bath in 75 ml of isopropanol for 2.5 hours. An additional 0.8 g (0.026 mol) of paraformaldehyde was added after 1 hour's boiling. Upon addition of 150 ml of acetone the HCl salt precipitated out. It was recrystallized from 80% methanol. Its melting point was 205° – 206° C and the yield 5 g.

EXAMPLE 14

1- Z -isoquinolyl-(4)-ketone

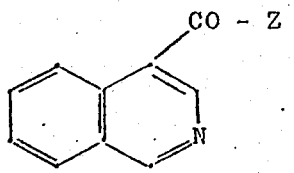

5 g (0.024 mol) of 4-acetyl isoquinoline . HCl, 4.6 g (0.024 mol) of 1-norephedrine . HCl and 0.7 g (0.024 mol) of paraformaldehyde were boiled on a water bath for 2.5 hours in 50 ml of a 1:1 mixture of ethanol-isopropanol and an additional 0.4 g (0.012 mol) of paraformaldehyde was added after 1 hour's boiling. Upon cooling, the dihydrochloride salt precipitated out. It was recrystallized from ethanol. Its melting point was 208° C and the yield 3 g.

EXAMPLE 15

1- Z -[1,2,4-trimethyl-5-carbethoxypyrrolyl-(3)]-ketone

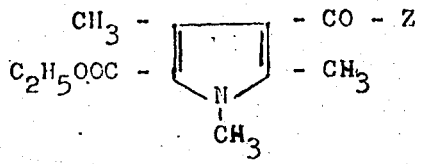

18 g (0.081 mol) of 1,2,4-trimethyl-3-acetyl-5-carbethoxypyrrole, 15.2 g (0.081 mol) of 1-norephedrine . HCl and 2.4 g (0.081 mol) of paraformaldehyde were boiled on a water bath for 1.5 hours in 50 ml of isopropanol. An additional 1.2 g of paraformaldehyde were added after ½ hour's boiling. Upon addition of 100 ml of acetone the HCl salt precipitated out. It was recrystallized from ethanol. Its melting point was 178° – 180° C and the yield 10 g.

EXAMPLE 16

1-6 3-[3-phenyl-3-hydroxy-propyl-(2)-amino]-propionyl -benzodioxane-(1,4)

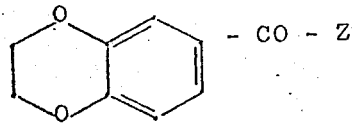

11.7 g (0.066 mol) of 6-acetyl-1,4-benzodioxane, 12.5 g (0.066mol) of 1-norephedrine . HCl and 2 g (0.067 mol) of paraformaldehyde were boiled on a water bath in 33 ml of isopropanol for 2 hours. An additional 2 g (0.067 mol) of paraformaldehyde were added after 1 hour's boiling. The solvent was distilled off and the residue treated with acetone. The HCl salt which precipitated out was recrystallized from ethanol. Its melting point was 201° C and the yield 7.5 g.

EXAMPLE 17

1-2- 3-[3-phenyl-3-hydroxy-propyl-(2)-amino]-propionyl -benzodioxane-(1,4)

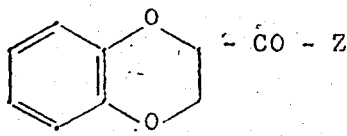

11 g (0.061 mol) of 2-acetyl-1,4-benzodioxane, 11.6 g (0.062 mol) of 1-norephedrine . HCl and 1.85 g (0.062 mol) of paraformaldehyde were reacted in 30 ml of isopropanol and processed as in Example 16. The melting point of the HCl salt was 178° C and the yield 8 g.

EXAMPLE 18

1- Z -[2-benzyl-10-hydroxy-decahydroisoquinolyl-(4)]-ketone

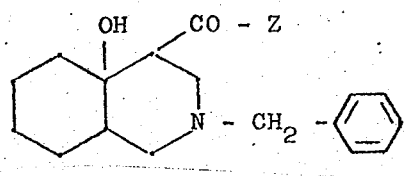

11 g (0.0339 mol) of 2-benzyl-4-acetyl-10-hydroxydecahydroisoquinoline . HCl, 6.5 g (0.035 mol) of 1-norephedrine . HCl and 1.4 g (0.047 mol) of paraformaldehyde were boiled on a water bath for 2 hours in 35 ml of isopropanol. An additional 1.4 g of paraformaldehyde were added after 1 hour's boiling. The solvent was then distilled off and acetone and ethyl acetate added to the residue. The dihydrochloride produced was recrystallized from ethanol. Its melting point was 182° – 183° C and the yield 7 g.

EXAMPLE 19

1- Z -[5-nitro-furyl-(2)]-ketone

11.6 g (0.075 mol) of 2-acetyl-5-nitro-furane, 14 g (0.075 mol) of 1-norephedrine . HCl and 3 g (0.1 mol) of paraformaldhyde in 50 ml of isopropanol were heated on a water bath for 3 hours. The HCl salt which precipitated out upon cooling was recrystallized from 80% ethanol. Its melting point was 210° C and the yield 3 g.

EXAMPLE 20

1-4- 3-[3-phenyl-3-hydroxy-propyl-(2)-amino]-propionyl -1,3,5-trimethyl pyrazole $$CH_3 - \underset{\underset{CH_3}{N}}{\boxed{\phantom{XXX}}} - CO - Z$$
$$- CH_3$$

27 g (0.178 mol) of 1,3,5-trimethyl-4-acetylpyrazole, 33 g (0.177 mol) of 1-norephedrine . HCl and 10.8 g (0.36 mol) of paraformaldehyde in 150 ml of isopropanol were heated for 2 hours on a water bath. Thereafter the solvent was distilled off and 100 ml acetone were added to the residue. The HCl salt which precipitated was recrystallized from isopropanol. Its melting point was 191° C and the yield was 14.5 g.

EXAMPLE 21

1-4- 3-[3-phenyl-3-hydroxy-propyl-(2)-amino]-propionyl -1-benzyl-3,5-dimethyl-pyrazole $$CH_3 - \underset{\underset{CH_2 - \phi}{N}}{\boxed{\phantom{XXX}}} - CO - Z$$
$$- CH_3$$

13.5 g (0.0624 mol) of 3,5-dimethyl-1-benzyl-4-acetyl-pyrazole, 11.1 g (0.0593 mol) of 1-norephedrine . HCl and 3.6 g (0.12 mol) of paraformaldehyde were heated on a water bath in 200 ml of isopropanol for 2 hours. The HCl salt precipitated out from the reaction solution after addition of 100 ml of acetone and it was recrystallized from ethanol. Its melting point was 200° C and the yield 11 g.

EXAMPLE 22 d,1- 2-[3-(3-fluoro-4-methoxy-phenyl)-3-hydroxypropyl-(2)-amino]-ethyl -thienyl-(2)-ketone $$\boxed{\phantom{X}}_S - CO - CH_2 - CH_2 -$$

$$NH - \underset{\underset{}{CH}}{\overset{CH_3}{|}} - CH(OH) - \phi - OCH_3$$
$$F$$

28 g (0.119 mol) of d,1-3-(3-fluoro-4-methoxyphenyl)-3-hydroxy-propyl-(2)-amine . HCl, 15 g (0.119 mol) of 2-acetyl-thiophene and 7.2 g (0.24 mol) of paraformaldehyde were reacted in 200 ml of isopropanol and processed as in Example 21. The HCl salt was recrystallized from ethanol. Its melting point was 208° C and the yield was 10 g.

EXAMPLE 23

1- 1-[3-phenyl-3-hydroxy-propyl-(2)-amino]-propyl-(2) -thienyl-(2)-ketone $$\boxed{\phantom{X}}_S - CO - \underset{\underset{}{CH}}{\overset{CH_3}{|}} - CH_2 -$$

$$NH - \underset{\underset{}{CH}}{\overset{CH_3}{|}} - CH(OH) - \phi$$

43 g (0.307 mol) of 2-propionyl-thiophene, 57.7 g (0.308 mol) of 1-norephedrine . HCl and 18.4 g (0.614 mol) of paraformaldehyde were heated on a water bath in 50 ml of isopropanol for 1 hour. 100 ml of acetone were added to the reaction solution and the HCl salt which precipitated out recrystallized from ethanol. Its melting point was 208° C and the yield was 16.5 g.

EXAMPLE 24

1- Z -5-chloro-thienyl-(2) -ketone $$Cl - \boxed{\phantom{X}}_S - CO - Z$$

30 g (0.187 mol) of 2-acetyl-5-chloro-thiophene, 35 g (0.187 mol) of 1-norephedrine . HCl and 5.6 g (0.187 mol) of paraformaldehyde were heated in 50 ml of isopropanol and processed as in Example 21. The HCl salt was recrystallized from ethanol. Its melting point was 198° C and the yield was 16 g.

EXAMPLE 25 d,1- 2-[2-(2-chloro-phenyl)-2-hydroxy-ethylamino]-ethyl -thienyl-(2)-ketone $$\boxed{\phantom{X}}_S - CO - CH_2 - CH_2 -$$

$$NH - CH_2 - CH(OH) - \phi$$
$$Cl$$

12.6 g (0.1 mol) of 2-acetyl-thiophene, 20.8 g (0.1 mol) of d,1-2-(2-chloro-phenyl)-2-hydroxy-ethylamine . HCl and 4.5 g (0.15 mol) of paraformaldehyde were heated on a water bath for 2 hours in 100 ml of isopropanol. Thereafter the solvent was distilled off and the residue caused to crystallized by addition of ethyl acetate. The HCl salt produced was recrystallized from ethanol. Its melting point was 158° – 160° C and the yield was 4 g.

EXAMPLE 26

[3-phenyl-3-hydroxy-propyl-(2)]- 3-[4-phenylthiazolyl-(2)]-3-hydroxy-propyl-(1) -amine $$\phi - \boxed{\phantom{X}}_S^N - CH(OH) - Z$$

6 g (0.015 mol) of 1- Z -[4-phenyl-thiazolyl-(2)]-ketone . HCl were suspended in 60 ml of methanol and reduced by the addition of 0.6 g (0.016 mol) of sodium borohydride. After 1 hour the solvent was distilled off and the residue dissolved in acetone. Fumaric acid was added to such solution to precipitate out the fumarate salt. The base was again set free from the fumarate with aqueous NaOH. The resulting oily base was taken up in ether and converted to the HCl salt with isopropanolic HCl and such salt recrystallized from ethanol. Its melting point was 178° – 181° C and the yield was 2.5 g.

EXAMPLE 27

[3-phenyl-3-hydroxy-propyl-(2)]- 3-[thienyl-(2)]-3-hydroxy-propyl-(1) -amine

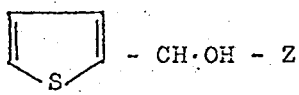

63 g (0.2 mol) of 1- Z -thienyl-(2)-ketone . HCl and 300 g of aluminum isopropylate were heated to 130° C for 2 hours in 2 liters of isopropanol and the acetone produced during the reduction distilled off over a column. After 7 hours the cooled solution was decomposed by addition of 100 g of citric acid in 200 ml of water and then rendered strongly alkaline with aqueous NaOH. The organic phase was dried over calcium oxide and the solvent distilled off under vacuum. The amino alcohol product melted at 123 – 125° C after it was recrystallized from 50% ethanol. Upon addition of an equimolar quantity of HCl a HCl salt was obtained which had a melting point of 152° – 155° C. The yield was 13 g.

EXAMPLE 28

[3-phenyl-3-hydroxy-propyl-(2)]- 3-[cumaronyl-(2)]-3-hydroxy-propyl-(1) -amine

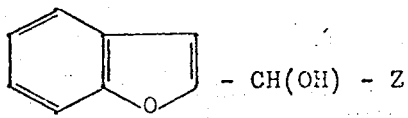

18 g (0.05 mol) of 1- Z -cumaronyl-ketone . HCl were suspended in 100 ml of ethanol and reduced at room temperature with 2 g of sodium borohydride dissolved in 50 ml of ethanol. After 1 hour, 50 ml of concentrated HCl were added and the NaCl produced filtered off. The solvent was then distilled off under vacuum and the residue recrystallized from isopropanol/ethyl acetate (1:1). The HCl salt produced melted at 210° – 215° C with decomposition. The yield was 11 g.

EXAMPLE 29

[3-phenyl-3-hydroxy-propyl-(2)]- [3-thionaphthenyl-(3)]-3-hydroxy-propyl-(1) -amine

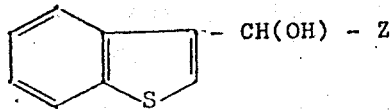

19 g (0.05 mol) 1-3-]phenyl-3-hydroxy-propyl-(2)-amino]-propionyl -thionaphthene . HCl were suspended in 100 ml of ethanol and reduced with 2 g of sodium borohydride in 50 ml of ethanol at room temperature. After 1 hour the reaction mixture was filtered and the solvent distilled off and the residue dissolved in ether. The HCl salt was precipitated from the ether solution by addition of ethanolic HCl and recrystallized from isopropanol. Its melting point was 167°– 170° C and the yield was 12 g.

The indole compounds of the present invention in addition to the pharmacological activities noted earlier have an inflammation repressing activity. Their antiphlogistic activity is much stronger than their heart circulatory activity.

The antiphlogistic action of the indoles were tested on the carrageenin edema of the rat's paw using the method of Domenjoz et al (Arch. exp. Pharm. Path 230 (1957) 325).

In these tests, when the compounds were applied orally at dosages in the range of 1 to 500 mg/kg of body weight strong antiphlogistic activity was noted. The best of the compounds had an edema repression of 50% at an oral dosage of 5 to 20 mg/kg.

To estimate the activity, the known antiphlogistic compound salicylamide was used as a standard. Lower dosages were required with most of the compounds of the invention to get an activity equal to that of salicylamide.

The indications for the compounds of the invention as inflammation repressing medicines are chronic polyarthritis
rheumatic illnesses
post traumatic inflammations
swellings at fractures
thrombophlebitis in any form (including post operative)
bursitis
synovitis
collagenoses (polymyositis, periartiitis)
gout The pharmacological handling of the compounds is according to the customary standard procedures, if desired in combination with other pharmaceutically active materials. The application, for example, can be enteral, parenteral, oral or per lingual as set forth above. The individual dose according to the indicated field and type of dispensing can be between 0.1 and 500 mg., one or more times a day.

Additional Examples of suitable indole compounds are set forth below

EXAMPLE 30 l-3- 3-[3-phenyl-3-hydroxypropyl-(2)-amino]-propionyl - indole

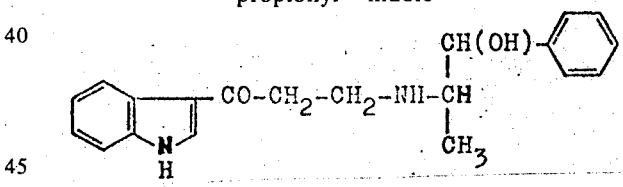

16.1 grams (0.1 mole) of 3-acetyl indole, 18.7 grams (0.1 mole) of l-norephedrine . HCl and 3.8 grams of paraformaldehyde (equivalent to 0.127 mole of formaldehyde) were heated at reflux in 100 ml. of isopropanol for 5 hours, wherein after 2 hours an additional 1.5 grams of paraformaldehyde were added. The solvent was distilled off, the residue treated with 10% soda lye and the base dissolved in ether from which the title compound of the example gradually recrystallized out, M.P. 140°C. yield 6 grams.

EXAMPLE 31 l-3- 3-[3-phenyl-3-hydroxypropyl-(2)-amino]-propionyl -1,2-dimethyl indole

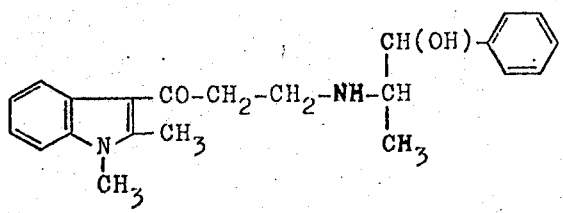

24 grams (0.128 mole) of 1,2-dimethyl-3-acetyl indole, 20 grams (0.132 mole) of l-norephedrine and 4 grams of paraformaldehyde (equivalent to 0.133 mole of formaldehyde) were dissolved in 70 ml. of isopropanol, adjusted to a pH of 3 with isopropanolic HCl and heated at reflux for 6 hours. The HCl salt of the title compound of the example was precipitated from the reaction solution with ether and recrystallized from methanol, M.P. 190°–192°C. yield 13 grams.

EXAMPLE 32 l-3- 3-[3-phenyl-3-hydroxypropyl-(2)-amino]-propionyl -2-methyl-5 methoxy indole

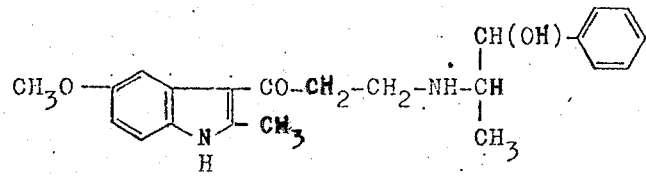

9.5 grams (46.7 millimoles) of 2-methyl-5-methoxy-3-acetyl indole, 9.5 grams (50.7 millimoles) of l-norephedrin.HCl and 1.5 grams of paraformaldehyde (equivalent to 50 millimoles of formaldehyde) were heated at reflux for 10 hours in a mixture of 40 ml. of isopropanol and 10 ml. of dimethyl formamide, wherein after 3 hours 0.7 grams of paraformaldehyde was added. The solvent was distilled off and the residue dissolved in acetone. The HCl salt of the title compound of the example gradually crystallized out and was recrystallized from a mixture of methanol and ether (-1to 1- parts by volume). M.P. 213°C. yield 4.5 grams.

In addition to the indole compounds set forth above other indole compounds within the invention include l-2- 3-[3-phenyl-3-hydroxy-propyl-(2)-amino]-propionyl -1-methyl indole; l-3- 3-[3-phenyl-3-hydroxypropyl-(2)-amino]-propionyl -1-methyl-2-hydroxy indole; l-3- 3-[3-phenyl-3-hydroxypropyl-(2)-amino]-propionyl -1-methyl-2-methoxy indole; 3- 3-[phenyl-3-hydroxyethyl-(2)-amino]-propionyl -1-ethyl indole; 3- 3-[3-phenyl-3-hydroxypropyl-(2)-amino]-propionyl 1,2,4-trimethyl indole; 3- 3-[3-phenyl-3-hydroxypropyl-(2)-amino]-propionyl -2-cabethoxy indole; 3- 3-[3-phenyl-3-hydroxypropyl-(2)-amino]-propionyl -1-methyl-5-chloro indole; 3- 3-[3-phenyl-3-hydroxypropyl-(2)-amino]-propionyl -1-methyl-2-phenyl indole; [3-phenyl-3-hydroxypropyl-(2)]- 3-[1-phenyl indolyl-(2)]-3-hydroxypropyl-(1) -amine.

The salts, e.g. the hydrochloride salts within the present invention are useful as curing agents for melamine-formaldehyde resins.

What is claimed is:

1. A compound having the formula:

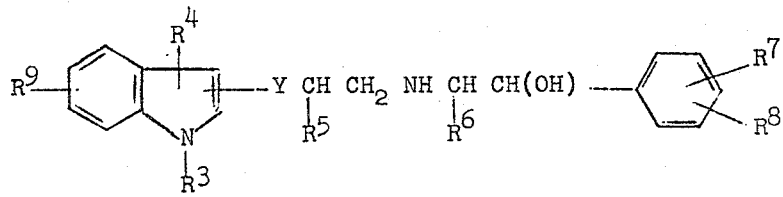

their pharmacologically acceptable salts and their pharmacologically acceptable quaternary ammonium salts where $R^3$ is H or methyl, ethyl $R^4$ is selected from the group consisting of hydrogen, methyl, phenyl, hydroxyl, and carbethoxy, $R^9$ is selected from the group consisting of hydrogen, halogen, methoxy, $R^5$ and $R^6$ are hydrogen or methyl, $R^7$ and $R^8$ are hydrogen, and and Y is selected from the group consisting of —CO— and CH(OH).

2. A compound according to claim 1 wherein $R^9$ is hydrogen and Y is in the 3 position.
3. A compound according to claim 2 wherein $R^5$ is hydrogen, $R^6$ is methyl and Y is —CO—.
4. A compound according to claim 3 wherein $R^4$ is hydrogen methyl.
5. A compound according to claim 1 wherein $R_3$ is H or methyl, $R_4$ is H or methyl, and $R_9$ is H or methoxy.
6. A compound according to claim 5 which is l-3[3-[3-phenyl-3-hydroxypropyl-(2)-amino]-propionyl]-1-methyl indole.
7. A compound according to claim 4 which is l-3- 3-[3-phenyl-3-hydroxypropyl-(2)-amino]-propionyl -indole.
8. A compound according to claim 4 which is l-3- 3-[3-phenyl-3-hydroxypropyl-(2)-amino]-propionyl -1,2-dimethyl indole.
9. A compound according to claim 1 wherein $R^9$ is methoxy and Y is in the 3 position.
10. A compound according to claim 9 which is l-3- 3-[3-phenyl-3-hydroxypropyl-(2)-amino]-propionyl -2-methyl-5-methoxy indole
11. A compound according to claim 1 wherein Y is in the 3 position.
12. A compound according to claim 1 wherein Y is in the 2 position.
13. A compound according to claim 12 wherein $R^4$ is methyl.
14. A compound according to claim 13 wherein Y is —CO—.

* * * * *

UNITED STATES PATENT OFFICE
CERTIFICATE OF CORRECTION

Patent No. 3,859,305                    Dated January 7, 1975

Inventor(s) Klaus Posselt and Kurt Thiele

It is certified that error appears in the above-identified patent and that said Letters Patent are hereby corrected as shown below:

On the cover page, after the line beginning [21], insert

[30] foreign application priority date

December 30, 1966 Germany D51910 and D51911.

Signed and sealed this 8th day of April 1975.

(SEAL)
Attest:

RUTH C. MASON
Attesting Officer

C. MARSHALL DANN
Commissioner of Patents
and Trademarks